3,126,590
REFRIGERATOR GASKET
Angelo Monti, Chicago, Ill., assignor to Jarrow Products, Inc., Chicago, Ill., a corporation of Illinois
Filed Jan. 30, 1961, Ser. No. 85,719
10 Claims. (Cl. 20—69)

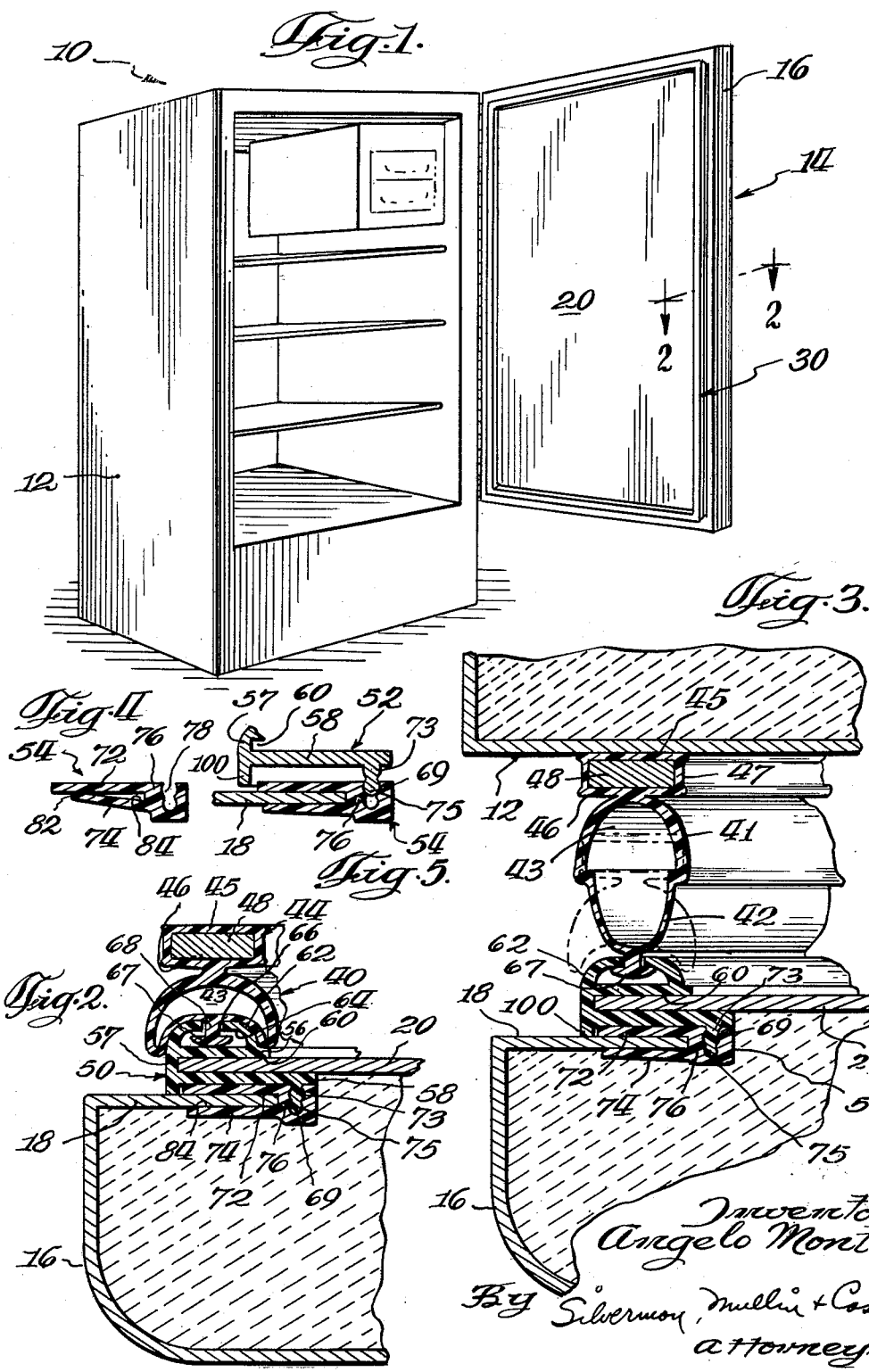
March 31, 1964  A. MONTI  3,126,590
REFRIGERATOR GASKET
Filed Jan. 30, 1961
Inventor
Angelo Monti
By Silverman, Mullin & Coss
attorneys

United States Patent Office 3,126,590
Patented Mar. 31, 1964

This invention relates generally to gaskets and more particularly concerns a novel gasket structure including a retainer therefor particularly adapted for use on the closure member of refrigerators, freezers, ice-boxes and the like for assuring a firm sealing connection between said closure and the body of the said articles.

This application is a continuation-in-part of my copending application Serial No. 42,422 filed July 12, 1960 and entitled "Refrigerator Gasket." The invention herein is an improvement over the structure disclosed in said copending application and particularly provides a gasket structure constructed in accordance with said application having magnetic means therein whereby a substantially perfect seal may be obtained between the closure member of said article and the body thereof.

In my co-pending application, there was disclosed a gasket assembly for a refrigerator having a pan and shell portion on the closure comprising both flexible and rigid members whereby the entire pan portion may be snapped onto the shell portion of said closure member and in which the said flexible member has a sealing cushion therein and is provided with means for engaging the above-mentioned retainer either before or after assembly of the pan and shell portions.

In many instances the frame and/or the pan portion of the closure member may be subject to warping or twisting whereby said gasket fails uniformly to contact the body portion so that a substantially perfect seal is achieved.

The objects and advantages enumerated in my co-pending application also apply to the invention herein disclosed, with the principal object herein comprising the provision of a gasket structure of the character described with magnetic insert means whereby a substantially perfect sealing relation is achieved.

Another object of the invention is to provide a magnetic insert for a removable gasket structure and provide means thereon whereby the flexible structure in effect moves toward the steel frame just before touching same and adheres thereto upon closing of the closure member.

Still another object of the invention is to provide, in a gasket structure wherein there is a flexible sealing member and a rigid retainer member, improvements in said flexible member including: magnetic means adapted to be disposed therein for adhering same to the body portion of the refrigerator, means whereby said flexible member may move back and forth in a small increment so as to assure a substantially perfect seal and to enable said gasket to reach out to engage with the surface of the body portion with the result that irregularities in the surface of said body will not affect the quality of the seal obtained and also to provide means on the flexible member whereby the flexible member may itself expand and stretch to permit quick and secure sealing adherence of the said member to the body of the refrigerator.

Another object of the invention herein is to provide an improved retainer structure for a removable gasket of the character disclosed in my copending application wherein said retainer has a pair of slot portions one for engaging the pan portion of the door, the other for engaging the shell portion of the door; said improvement comprising forming either of said formations with the slots resiliently closed thereby substantially improving the frictional adherence of the retainer to the respective pan and shell portions.

Still a further object of the invention is to provide one of said rigid members with a cooperating lip formation closing off the edge thereof to prevent passage of dust and the like between said members when the two parts are seated cooperatingly.

A further object of the invention is to provide in a device of the character described, a two-stage snap-in connection whereby the parts are assembled easier and any distortion effects upon the snap-in connection substantially are minimized.

Still other advantages and objects of the invention will be recognized by the skilled artisan as the description proceeds. The invention consists of certain novel features of construction, arrangement and a combination of parts hereinafter fully described, illustrated in the accompanying drawing, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawing a preferred embodiment thereof, from an inspection of which, when considered in connection with the following description, this invention, its mode of construction, assembly and operation, and many of its advantages should be readily understood and appreciated.

Referring to the drawing in which the same characters of reference are employed to indicate corresponding or similar parts throughout the several figures of the drawing:

In the drawing:

FIG. 1 is a perspective view of a typical refrigerator structure having a gasket assemblage embodying the features of the invention operatively installed thereon.

FIG. 2 is an enlarged sectional view taken along lines 2—2 of FIG. 1 and in the direction indicated.

FIG. 3 is a diagrammatic enlarged sectional view of the device assembly shown in FIG. 2 shown with the gasket structure at its maximum expansion while the refrigerator door is being opened or closed.

FIG. 4 is a sectional view of the shell engaging rigid portion of the retainer before assembly to the closure.

FIG. 5 is a fragmentary sectional view of the retainer elements shown in FIGS. 2 and 3 illustrating same partially assembled.

The gasket assembly embodying the features of the invention herein will be described in connection with a refrigerator although the invention is not limited thereto.

In FIG. 1 there is illustrated a typical refrigerator 10 having a body portion 12 and a closure member or door 14 hingedly mounted thereon. The refrigerator door 14 is formed with a shell portion 16 having a reverse bent lip 18, and a pan portion 20 adapted to be secured onto the lip portion providing means for retaining insulation and the like disposed within the shell portion.

The sealing gasket assembly with which the invention is concerned is designated generally by reference character 30 and comprises a flexible gasket member 40 of rubber, resilient plastic or other suitable material, and a gasket retaining assembly 50.

The gasket retaining assembly 50 is formed of substantially rigid material such as polyvinyl chloride and may be extruded or otherwise formed. Said assembly 50 comprises a pair of elongate members 52 and 54, member 52 adapted to be engaged onto the pan 20 at the periphery thereof and member 54 adapted to be engaged upon the lip 18. The member 52 is preferably formed as an elongate extruded length of rigid material such as polyvinyl chloride or other plastic composition. Said retainer 52 comprises top and bottom walls 56 and 58 respectively, said walls being joined to one another by a connecting part 57 integral therewith, thereby forming a slot 60 therebetween. The distance between walls 56 and 58 is chosen so as to permit the periphery of the pan to be slidably received within said slot 60.

The upper wall 56 is provided with a thickened formation 62 and said thickened portion 62 is provided with an interior hollow channel 64 along its length, and said channel having a constricted entrance way 66. The width of the entrance way 66 is chosen so as to retain within channel 64 the enlarged bottom portion 67 of the depending flange 68 of the flexible gasket portion to be later described, the cross-section of the gasket being crescent shaped. While the enlarged portion 67 is retained within said channel, the width of the entrance way 66 is such as to permit limited vertical movement of the flange 68.

The lower wall 58 is provided adjacent its free end with an integral depending flange 69. The depending flange 69 has a pair of integral parallel bulges 73 and 75 adapted to cooperate with means provided in the retaining member 54 described hereinafter.

The flexible gasket member 40 may be formed of an extruded length of flexible rubber-like material having compression characteristics dependent on the type of latch used for the particular refrigerator and is formed of a pair of arcuate walls 41 and 42 having tapering common side edges. Wall 42 is thinner relative the wall 41 so that said wall 42 is more flexible and can stretch and/or expand to a greater degree than wall 41. The gasket member 40 is formed such in normal configuration wall 42 is provided with a greater radius of curvature than wall 41 whereby a hollow center 43 is formed thereby providing an air cushion in the gasket. The depending flange 68 is integral with wall 42 on its under surface located between the common side edges of said walls. Flange 68 is provided with the above-mentioned enlarged formation 67 which, in the embodiment shown illustrated herein has the cross-sectional configuration of an arrow head. Both the flange 68 and the enlarged portion 67 extend along the length of the gasket 40. The enlarged portion 67 being of the same flexible material as the gasket body is deformable to enable separation of the gasket members 40 from the retainer when desired. Obviously assembly may be effected by forcing the flange 68 through the entrance way 66 into channel 60.

Wall 41 is provided with a hollow formation 44 integrally connected thereto and extending the length thereof. In the embodiment shown illustrated, this formation is substantially rectangular having top and bottom walls 45 and 46 respectively and side walls 47, wall 46 being integral with wall 41. Magnets 48 of configuration to be received within said hollow formation are disposed therein along the length thereof. Top wall 41 is substantially flat to present a flat surface engageable with the metal surface of the body 12 of the refrigerator 10. When the door 14 is at rest, either open or closed, the gasket usually appears as shown in FIG. 2. This assumes that there is no warpage in the refrigerator opening or door.

The second relatively rigid member 54 of the gasket retaining assembly 50 also comprises an elongate member preferably extruded of a material similar to that forming member 52. This member 54 is formed of top and bottom walls 72 and 74 respectfully joined integrally by connecting wall 76. Connecting wall 76 is provided with a ridged slot 78 extending the length of said member 54 and of such configuration to accommodate the ridged flange 69 of member 52 therein in a two-stage snap-in relationship. Instead of extending parallel with the top wall 72, during formation bottom wall 74 extends in a direction approaching member 54 so as partially to close the space between walls as shown at 82 in FIG. 4. The slot 84 formed, which is adapted to receive the reverse bent lip 18 of the shell 16 therein, is therefore initially biased to closed condition. To cause the reverse bent lip 18 to engage with said slot 84 it is thus necessary to force wall 74 outward, after which it will tend to return and thereby tightly engage lip 18.

In FIG. 3 there is illustrated a diagrammatic view of the gasket assembly 30 in connection with which the operation of the gasket structure 40 may be described. From the position of the gasket shown in FIG. 2, as the door is in the process of being closed, the gasket magnetic member 48 disposed in portion 44 of the gasket 40 is attracted in the direction of the metal frame of the body 12. This action causes the gasket 40 to move vertically toward the said body through a first stage shown in dotted line representation. In this position, the narrow portion of the flange 68 has moved through the constricted opening 66 of retaining member 52 until the enlarged portion 67 abuts the top of the channel 60. Note that in this first position, the walls 41 and 42 do not stretch or expand but remain substantially in the same position assumed when the gasket structure is at rest. The magnetic attraction of member 48 to the body 12 may under extreme conditions require considerable movement of the gasket. Under such circumstances the wall 42, being of substantially thinner dimension than wall 41 expands and stretches and may extend to a maximum shown in full lines in said FIG. 3 greatly enlarging the air cushion 43 of the gasket.

When the door 14 is opened, portion 67 of flange 68 of the gasket may first be moved outward of the channel 64 to engage the top of the channel at the constricted opening 66. The second portion of the movement is when the wall 42 is stretched by continued application of force required to open the door 14 until the maximum expansion is reached and the magnetic portion 44 disengages from the body 12. It can be seen that ample allowance for variations in the surface of either the pan or the body is provided by the variation in possible rest position of the length of the narrow portion of the flange 68 and in active sealing position by the range of expansion of wall 42.

The method of assembly of the pan and shell portions which incorporate the gasket and retainer assembly of the invention is identical to that described in my co-pending application and for a detailed description thereof reference is made to said co-pending application.

In this structure, the bulges 73 and 75 provides a two-stage or step-wise snap-in structure in cooperation with the slot 78 which had two conformingly bulged parts. Thus, the flange 69 may be snapped into position in two movements. In the first the lower bulge 75 enters the upper bulge of the slot, and in the second, the lower bulge 75 enters the lower bulge of slot 78 while the upper bulge 73 enters the upper bulge. Beside providing a firm connection, the structure enables a firm connection even in the first stage of snap-in movement where distortion or warpage prevent complete seating.

Attention is also directed to the overhanging lip 100 which closes the structure and presents a neat appearance while keeping dirt, moisture and debris out of the interior of the assembly.

The particular configuration of the gasket member 40 is determined by the nature of the article to which it is to be applied and the compression requirements thereof. It is also apparent that the principles of this invention apply with great advantage to the other embodiments of the invention described in my co-pending application as well as to other gasket structures. Many variations in minor details, size, configuration, dimensions, and the like are contemplated without departure from the scope and concept of the invention as defined in the claims appended hereto.

I claim:

1. A gasket assembly for a refrigerator having a cabinet body and a door comprising, an assemblage of at least two elongate members, one being formed of rubber-like flexible material and serving as a gasket, the second being of relatively rigid material and serving as a gasket retainer, cooperating coupling means operatively associated with said members for removably securing one to the other, said first member comprising a pair of superposed arcuate walls of differing radii of curvature having common edges, one of said walls being readily deformable and the other one of said walls having a hollow extension integral therewith along the length thereof and a magnet disposed within said extension, said coupling means comprising a depending tongue having an enlarged end formed integral with said one of said walls and a channel formed in the second member, said channel opening toward said depending tongue, the opening of the channel being restricted and the said enlarged end engageable within said channel through said restricted opening thereby coupling the gasket to the holder, the depth of the channel and the width of the opening being of sufficient size to permit limited transverse movement of said tongue within said channel, and means securing the second member to the refrigerator door.

2. The assembly as claimed in claim 1 in which the gasket is selectively movable between a rest position and a pair of active positions during opening and closing of the refrigerator door, said rest position defined by the cross section of said walls assuming a crescent configuration with the enlarged end of the tongue spaced from the constricted opening of the channel interior thereof, and the pair of active positions comprising a first active position with the said walls assuming a crescent cross-section and the enlarged end of the tongue abutting the second member at the constricted opening of the channel, and a second active position with the said walls assuming an oval cross-section and the enlarged end of the tongue also abutting the second member at the constricted opening of the channel.

3. The assembly as claimed in claim 1 in which said refrigerator door is provided with separate pan and shell portions and said shell portion has an inwardly oriented flange and said means for securing said second member to said door comprise slot means formed in said second member.

4. The assembly as claimed in claim 3 in which said second member comprises a pair of rigid members, said rigid members having second coupling means thereon for securing same one to the other, said second coupling means comprising a depending flange on one of said rigid members and a slot opening to said depending flange on the other one of said rigid members, said flange having a parallel ribbed configuration and the slot having a conforming ridged configuration adapted to receive said flange in a step-wise snap-in connection.

5. The assembly as claimed in claim 4 in which said pair of members each have a horizontal slot formed therein opening to the side of each member, said horizontal slots being parallel and opening on opposite sides relative one another, one of said slots defining a bight adapted to tightly frictionally receive the pan portion and the other one of said slots defining a bight adapted to tightly frictionally receive the inwardly oriented flange of the shell portion, said horizontal slots defining said slot means.

6. The assembly as claimed in claim 5 in which at least one of said horizontal slots is biased closed off by a portion of the rigid member defining same, said latter portion being resilient and adapted to be forcibly opened to receive the respective portion of the refrigerator door.

7. The assembly as claimed in claim 4 in which one rigid member has a depending edge flange abutting the shell portion adjacent the second rigid member when said rigid members are coupled one to the other.

8. A gasket assembly for refrigerators and the like having a cabinet body and a door to be sealably engaged therewith, said door having separable pan and shell portions with the shell portion having an inwardly directed flange along the periphery thereof, said gasket assembly including a soft, flexible gasket member and a gasket holder of rigid material, first coupling means for releasably securing the gasket to said holder, said first coupling means comprising a depending flange having an enlarged end on said gasket, and a formation on said holder having a channel formed along the length thereof opening toward said depending flange, the opening of said channel being restricted and the said enlarged end removably engageable within said channel through said restricted opening thereby coupling said gasket to said holder, said holder having second coupling means for releasably securing the pan and shell portions thereto, said second coupling means comprising a pair of parallel slots formed in said holder, one of said slots adapted to receive the peripheral portion of the pan in frictional engagement therewithin, the other of said slots adapted to receive the inwardly directed flange of said shell portion in frictional engagement therewithin, said gasket being formed of a pair of superposed wall portions having differing radii of curvature and having common edges, one of said wall portions having a hollow extension integral therewith along the length thereof and adapted to receive a magnet therewithin, the other one of said wall portions having the said depending flange formed integral therewith and being movable to increase the distance between said pair of wall portions during making and breaking the sealing engagement of said gasket with the cabinet body of the refrigerator.

9. A gasket assembly structure for a refrigerator which includes a refrigerator cabinet body and a refrigerator door, said structure comprising, a hollow first strip member of resilient flexible material, a second strip member of relatively rigid material, first cooperating means on said members for removably coupling same one to the other, second cooperative means formed on said second strip member for securing the coupled strip members to said door, magnetic means disposed within said first strip member in closer proximity to the refrigerator body than the other portions of said first strip member whereby to form a substantially perfect seal therebetween, said first cooperative means comprising, a tongue integral with one of said strip members and a channel formed in the other of said strip members, and means permitting limited transverse movement of said tongue within said channel and preventing transverse movement of said tongue exterior of said channel during normal use of said gasket structure, said second strip member being formed as a pair of rigid elongate strip members having third cooperative means thereon securing same one to the other, said third cooperative means comprising, a double-ribbed depending flange integral with one of said rigid elongate strip members, the other of said rigid elongate strip members having a slot of matching configuration formed therein adapted to receive the ribbed portion of said flange in a snap-in connection.

10. The gasket structure as claimed in claim 9 in which said second cooperative means comprises at least one side-opening slot normally biased to a closed condition provided in at least one of said rigid strip members, said slot adapted to be flexed open whereby a portion of said refrigerator door may be tightly received therein.

References Cited in the file of this patent

UNITED STATES PATENTS

| 2,619,693 | Harle | Dec. 2, 1952 |
| 2,659,118 | Anderson et al. | Nov. 17, 1953 |
| 2,693,009 | Beck | Nov. 2, 1954 |
| 2,958,912 | Bower et al. | Nov. 8, 1960 |

FOREIGN PATENTS

| 1,025,365 | France | Jan. 21, 1953 |